United States Patent
Hirosawa (10) Patent No.: US 12,415,529 B2
(45) Date of Patent: Sep. 16, 2025

(54) CONTROL DEVICE, CONTROL METHOD, AND STORAGE MEDIUM

(71) Applicant: HONDA MOTOR CO., LTD., Tokyo (JP)

(72) Inventor: Nozomu Hirosawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 18/113,102

(22) Filed: Feb. 23, 2023

(65) Prior Publication Data

US 2023/0303100 A1    Sep. 28, 2023

(30) Foreign Application Priority Data

Mar. 23, 2022 (JP) ................. 2022-047337

(51) Int. Cl.
*B60W 50/08* (2020.01)
*B60Q 1/34* (2006.01)
(Continued)

(52) U.S. Cl.
CPC ........... *B60W 50/082* (2013.01); *B60Q 1/346* (2013.01); *B60W 30/18163* (2013.01);
(Continued)

(58) Field of Classification Search
CPC .... B60W 50/082; B60W 50/14; B60W 30/12; B60W 30/18163; B60W 30/18;
(Continued)

(56) References Cited

U.S. PATENT DOCUMENTS

2017/0240172 A1* 8/2017 Nishiguchi ........... B60W 50/14
2018/0345964 A1  12/2018 Fujii et al.
(Continued)

FOREIGN PATENT DOCUMENTS

JP  H11-189071  7/1999
JP  2018-114930  7/2018
(Continued)

OTHER PUBLICATIONS

Japanese Notice Of Allowance for Japanese Patent Application No. 2022-047337 mailed Jan. 9, 2024.
(Continued)

*Primary Examiner* — Ramon A. Mercado
*Assistant Examiner* — Ellis B. Ramirez
(74) *Attorney, Agent, or Firm* — Amin, Turocy & Watson, LLP (57) ABSTRACT

At least one processor detects whether a steering wheel is being gripped by a user who operates a mobile object, executes first movement control that is executable with the steering wheel not being gripped, and second movement control that is executable with the steering wheel being gripped, notifies the user, by using an outputter, that the user is requested to grip the steering wheel when gripping of the steering wheel is not detected after an operator for operating a direction indicator is operated while the first movement control is being executed with the steering wheel not being gripped, and continues the first movement control without shifting to the second movement control when the gripping is not detected after the notification is made.

12 Claims, 5 Drawing Sheets

(51) Int. Cl.
  *B60W 30/18*   (2012.01)
  *B60W 50/14*   (2020.01)
(52) U.S. Cl.
  CPC ....... *B60W 50/14* (2013.01); *B60W 2420/403* (2013.01); *B60W 2540/18* (2013.01); *B60W 2540/20* (2013.01)
(58) Field of Classification Search
  CPC ....... B60W 2420/403; B60W 2540/18; B60W 2540/20; B60W 2540/223; B60W 40/09; B60Q 1/346; B60R 16/023
  USPC .......... 701/26, 23, 41, 62, 63, 301; 340/435, 340/903
  See application file for complete search history.

(56) References Cited

U.S. PATENT DOCUMENTS

| | | | | |
|---|---|---|---|---|
| 2018/0348779 | A1* | 12/2018 | Oniwa | ................ B60T 8/17557 |
| 2018/0373250 | A1* | 12/2018 | Nakamura | ........... G06V 20/597 |
| 2019/0071099 | A1* | 3/2019 | Nishiguchi | ........ B62D 15/0255 |
| 2020/0207355 | A1* | 7/2020 | Ishioka | .................. G08G 1/167 |
| 2020/0231159 | A1 | 7/2020 | Tsuji et al. | |
| 2020/0307595 | A1 | 10/2020 | Kato et al. | |
| 2020/0369281 | A1 | 11/2020 | Sato | |
| 2020/0398849 | A1* | 12/2020 | Kanoh | ..................... G08G 1/16 |
| 2021/0146962 | A1* | 5/2021 | Kaji | ....................... B60W 30/17 |
| 2022/0097709 | A1* | 3/2022 | Adam | ...................... B60Q 9/00 |
| 2022/0234607 | A1 | 7/2022 | Hata et al. | |

FOREIGN PATENT DOCUMENTS

| | | |
|---|---|---|
| JP | 2018-203119 | 12/2018 |
| JP | 2019-123299 | 7/2019 |
| JP | 2019-142246 | 8/2019 |
| JP | 2019-168814 | 10/2019 |
| JP | 2020-114699 | 7/2020 |
| JP | 2020-125026 | 8/2020 |
| JP | 2020-147217 | 9/2020 |
| JP | 2020-163907 | 10/2020 |
| JP | 2020-189543 | 11/2020 |
| JP | 2021-091282 | 6/2021 |
| JP | 2021-102436 | 7/2021 |
| WO | 2020/230312 A1 | 11/2020 |

OTHER PUBLICATIONS

Japanese Office Action for Japanese Patent Application No. 2022-047337 mailed Oct. 10, 2023.

* cited by examiner

CONTROL DEVICE, CONTROL METHOD, AND STORAGE MEDIUM

CROSS-REFERENCE TO RELATED APPLICATION

Priority is claimed on Japanese Patent Application No. 2022-047337, filed Mar. 23, 2022, the content of which is incorporated herein by reference.

BACKGROUND

Field of the Invention

The present invention relates to a control device, a control method, and a storage medium.

Description of Related Art

In recent years, efforts to provide a sustainable transportation system that takes into account various situations have been actively made. To realize this, research and development to further improve the safety and convenience of traffic through research and development related to driving support technology has mainly been focused upon. For example, a driving support device that controls a vehicle in a driving mode that does not require steering of a driver has been disclosed (Japanese Unexamined Patent Application, First Publication No. 2019-123299). This driving support device prompts the driver to grip the handle when the vehicle approaches a lane change point in a second driving assistance mode, and automatically performs retraction when the driver does not grip the handle.

SUMMARY

In the conventional technology, when the driver does not grip the handle, retraction is performed automatically, which may cause inconvenience for the user.

The present invention has been made in view of such circumstances, and an object thereof is to provide a control device, a control method, and a storage medium that can improve a user's convenience. By extension, it will contribute to the development of sustainable transportation systems.

The control device, the control method, and the storage medium according to the present invention have adopted the following configuration.

(1): A control device mounted on a mobile object according to one aspect of the present invention includes a storage medium configured to store computer-readable instructions, and at least one processor connected to the storage medium, in which the at least one processor executes the computer-readable instructions, thereby detecting whether a steering wheel is being gripped by a user who operates a mobile object, executing first movement control that is executable with the steering wheel not being gripped, and second movement control that is executable with the steering wheel being gripped, notifying the user, by using an outputter, that the user is requested to grip the steering wheel when gripping of the steering wheel is not detected after an operator for operating a direction indicator is operated while the first movement control is being executed with the steering wheel not being gripped, and continuing the first movement control without shifting to the second movement control when the gripping is not detected after the notification is made.

(2): In the aspect of (1) described above, the at least one processor stops the first movement control and executes the second movement control when gripping of the steering wheel is detected after the operator is operated while the first movement control is being executed with the steering wheel not being gripped.

(3): In the aspect of (2) described above, the second movement control is control that causes the mobile object to change lanes according to an operation of the operator.

(4): In the aspect of (3) described above, at least one processor stops the second movement control and resumes the first movement control when the lane change is completed.

(5): In the aspect of any one of (1) to (4) described above, the at least one processor notifies that the first movement control will be started before the starting the first movement control when the processor starts the first movement control when the first movement control is not being executed.

(6): In the aspect of any one of (1) to (5) described above, the at least one processor notifies that the second movement control will be started before the starting the second movement control when the processor starts the second movement control when the second movement control is not being executed.

(7): In the aspect of any one of (1) to (6) described above, the first movement control is control that causes the mobile object to move without depending on an operation of the user so that the mobile object does not deviate from a traveling lane with the steering wheel not being gripped, and the second movement control is control that causes the mobile object to change lanes, without depending on an operation of the user, to a lane adjacent to the traveling lane from the traveling lane with the steering wheel being gripped.

(8): In the aspect of (7) described above, at least one processor determines whether a user is monitoring the front on the basis of an image captured by a camera that captures an image of the user, executes the first movement control when the user is monitoring the front, and does not execute the first movement control or stops the first movement control that is being executed when the user is not monitoring the front.

(9): In the aspect of any one of (1) to (8) described above, the at least one processor causes the direction indicator to light or blink according to an operation of the operator after the operator for operating the direction indicator is operated while the first movement control is being executed with the steering wheel not being gripped, notifies the user that the user is requested to grip the steering wheel after the operation is performed, and continues the first movement control and returns the direction indicator to a state before the operation without shifting to the second movement control when the gripping is not detected after the notification is made.

(10): In the aspect of any one of (1) to (9) described above, after an operator for operating the direction indicator is operated while the first movement control is being executed with the steering wheel not being gripped, the at least one processor causes the mobile object to change lanes to a lane adjacent to a traveling lane by causing the direction indicator to light or blink when (i) gripping of the steering wheel is detected and (ii) lane change conditions are satisfied and after an operator for operating the direction indicator is operated while the first movement control is being executed with the steering wheel not being gripped, does not cause the mobile object to change lanes to a lane adjacent to a traveling lane without causing the direction indicator to light or blink when (i) gripping of the steering wheel is not detected or (ii) lane change conditions are not satisfied.

(11): A control method according to another aspect of the present invention includes, by a control device, processing of detecting whether a steering wheel is being gripped by a user who operates a mobile object, processing of executing first movement control that is executable with the steering wheel not being gripped and second movement control that is executable with the steering wheel being gripped, processing of notifying the user, by using an outputter, that the user is requested to grip the steering wheel when gripping of the steering wheel is not detected after an operator for operating a direction indicator is operated while the first movement control is being executed with the steering wheel not being gripped, and processing of continuing the first movement control without shifting to the second movement control when the gripping is not detected after the notification is made.

(12): A program stored in a non-transitory computer storage medium according to still another aspect of the present invention causes a control device to execute processing of detecting whether a steering wheel is being gripped by a user who operates a mobile object, processing of executing first movement control that is executable with the steering wheel not being gripped and second movement control that is executable with the steering wheel being gripped, processing of notifying the user, by using an outputter, that the user is requested to grip the steering wheel when gripping of the steering wheel is not detected after an operator for operating a direction indicator is operated while the first movement control is being executed with the steering wheel not being gripped, and processing of continuing the first movement control without shifting to the second movement control when the gripping is not detected after the notification is made.

According to the aspects (1) to (12), user convenience can be improved. Furthermore, it is possible to improve marketability.

According to the aspect (2) or (3), since second movement control is executed, it is possible to realize control in line with an intention of the user.

According to the aspect (4), since the second movement control is stopped and the first movement control is resumed when the lane change is completed, it is possible to increase time during which the first movement control is executed and to improve the user's convenience and marketability.

According to the aspect (5) or (6), since notification indicating that control will be started is performed before the control is started, the user can easily recognize what kind of control will be performed next.

According to the aspect (9), the control device automatically controls the direction indicator so that it is turned off when a lane change is not performed, it is possible to improve the user's convenience and to realize consideration for the surroundings.

According to the aspect (10), since the control device causes the direction indicator to light or blink when a lane change is performed, it is possible to improve the user's convenience and to realize consideration for the surroundings.

DETAILED DESCRIPTION

Overall Configuration

Figure 1:
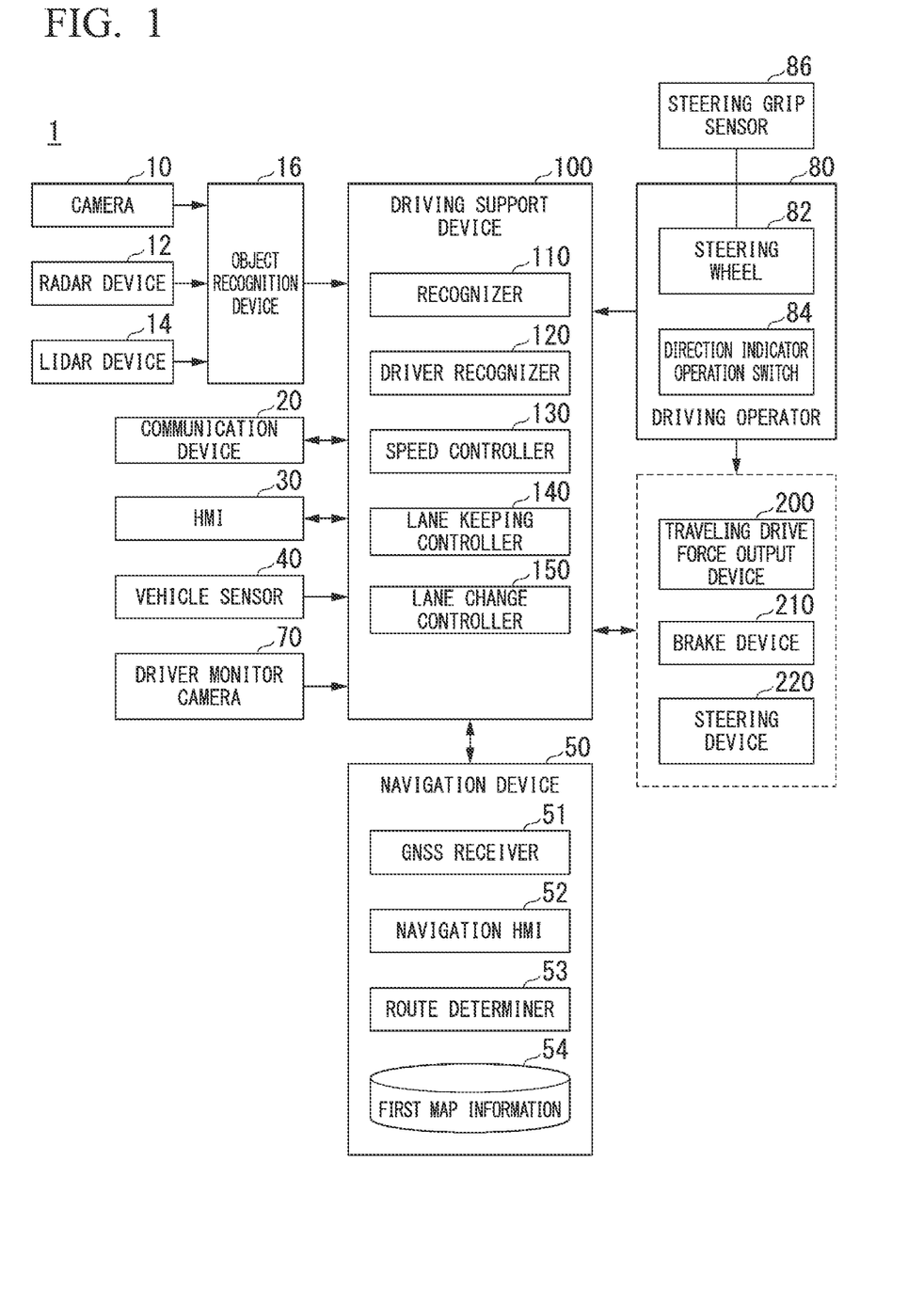
FIG. 1 is a configuration diagram of a vehicle system using a vehicle control system according to an embodiment.

FIG. 1 is a configuration diagram of a vehicle system 1 using a vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, and a vehicle sensor 40, a navigation device 50, a driver monitor camera 70, a driving operator 80, a driving support device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. The driving support device 100 is an example of the "control device."

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a host vehicle M). When an image of the front is captured, the camera 10 is attached to an upper part of the front windshield, a back surface of the windshield rear-view mirror, and the like. The camera 10 periodically and repeatedly captures, for example, a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves) reflected by the object. The radar device 12 is attached to an arbitrary place on the host vehicle M. The radar device 12 may detect the position and speed of an object in a frequency modulated continuous wave (FM-CW) method.

The LIDAR 14 irradiates the periphery of the host vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the host vehicle M.

The object recognition device 16 performs sensor fusion processing on a result of detection by a part or all of the camera 10, the radar device 12, and the LIDAR 14, and recognizes the position, type, speed, and the like of an object. The object recognition device 16 outputs a result of recognition to the driving support device 100. The object recognition device 16 may output the results of detection by the camera 10, the radar device 12, and the LIDAR 14 to the driving support device 100 as they are. The object recognition device 16 may be omitted from the vehicle system 1.

The communication device 20 communicates with other vehicles present in the periphery of host the host vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the host vehicle M and receives an input operation by the occupant. The HMI 30 includes various display devices, speakers, buzzers, touch panels, switches, keys, and the like. FIG. 1 shows a display device 32 included in the HMI 30. The display device 32 is provided, for example, in a central portion of an instrument panel of the host vehicle M, and is a display device, a so-called information display, for displaying various types of information on the host vehicle M, such as a speed meter (speedometer) representing a traveling speed of the host vehicle M or a rotational speed meter (tachometer) representing the number of revolutions (rotational speed) of an internal combustion engine provided in the host vehicle M. A terminal device of a user that wirelessly communicates with the vehicle system 1 may also function as the HMI.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The driver monitor camera 70 is, for example, a digital camera using a solid-state imaging device such as CCD or CMOS. For example, the driver monitor camera 70 is attached at any place on the host vehicle M, which is a position and a direction at which the head of an occupant (hereafter referred to as a driver) seated in a driver's seat of the host vehicle M can be imaged from the front (in a direction for imaging the face). For example, the driver monitor camera 70 is attached to an upper portion of a display device provided in a center portion of an instrument panel of the host vehicle M. The driver monitor camera 70 outputs to the driving support device 100 an image of an interior of a vehicle including the driver of the host vehicle M captured from a position where it is disposed.

The driving operator 80 includes, for example, in addition to the steering wheel 82 and a direction indicator operation switch 84, an accelerator pedal, a brake pedal, a shift lever, and other operators. The driving operator 80 has a sensor that detects the amount of operation or a presence or absence of an operation attached thereto, and a result of detection is output to the driving support device 100, or some or all of the traveling drive force output device 200, the brake device 210, and the steering device 220. The steering wheel 82 does not necessarily have to be circular, and may be in a form of a deformed steering wheel, a joystick, a button, or the like. A steering grip sensor 86 is attached to the steering wheel 82.

The direction indicator operation switch 84 is a switch for lighting or blinking a direction indicator (not shown) of the host vehicle M. The direction indicator operation switch 84 is, for example, a lever-type operator. The direction indicator operation switch 84 outputs a signal according to an operation, and the host vehicle M performs control according to the signal. The direction indicator operation switch 84 receives, for example, an operation in a first operation mode and a second operation mode, and outputs a signal according to an operation mode. An operation mode different from these may also be included.

The first operation mode is, for example, an operation in which the driver half-presses a lever of the direction indicator operation switch 84. The position of the lever is kept while the lever of the direction indicator operation switch 84 is operated in the first operation mode, and the position of the lever moves to a neutral position (reference position) at a timing when the lever is no longer operated. For example, when the driver moves the lever to a predetermined position, for example, when a direction indicator on a left side is activated and the driver leaves the hands in this state, the direction indicator automatically moves to the neutral position, and the activated direction indicator on the left side stops.

The second operation mode is, for example, an operation in which the driver fully presses the lever of the direction indicator operation switch 84. For example, once the direction indicator lever is pushed all the way down by the driver, the direction indicator continues to operate until the driver pushes the direction indicator lever down or until the steering wheel returns to its neutral position after being operated.

The steering grip sensor 86 is realized by, for example, a capacitance sensor or a piezoelectric element. The steering grip sensor 86 detects whether the driver is gripping the steering wheel 82. "Gripping" means a state in which the driver is holding the steering wheel, or a state in which the drivers hand is in contact with the steering wheel and a force equal to or greater than a predetermined degree is applied to the steering wheel. The steering grip sensor 86 is an example of a "detector."

The steering grip sensor 86 detects the gripping on the basis of an image captured by the camera, or detects the gripping using an optical method such as a radar device (a method that does not require contact with a sensor).

The driving support device 100 includes, for example, a recognizer 110, a driver recognizer 120, a speed controller 130, a lane keeping controller 140, and a lane change controller 150. The recognizer 110, the driver recognizer 120, the speed controller 130, the lane keeping controller 140, and the lane change controller 150 are realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the driving support device 100, or may be stored in a detachable storage medium such as a DVD or a CD-ROM and installed in the HDD or flash memory of the driving support device 100 by the storage medium (non-transitory storage medium) being attached to a drive device.

The recognizer 110 recognizes the position of an object in the periphery of the host vehicle M and states such as a speed and acceleration thereof on the basis of information input from the camera 10, the radar device 12, and the LIDAR 14 via the object recognition device 16. The position of an object is recognized as, for example, a position on absolute coordinates with a representative point (a center of gravity, a center of a drive axis, or the like) of the host vehicle M as an origin, and is used for control. The position of an object may be represented by a representative point such as the center of gravity or a corner of the object, or may be represented by an area. The "states" of an object may include the acceleration or jerk of the object, or a "behavioral state" (for example, whether a lane is being changed or is about to be changed).

The recognizer 110 recognizes, for example, a lane (a traveling lane) in which the host vehicle M is traveling. For example, the recognizer 110 recognizes a traveling lane by comparing a pattern of road lane marking (for example, an array of solid lines and broken lines) obtained from the second map information 62 with a pattern of road lane marking in the periphery of the host vehicle M recognized from an image captured by the camera 10. The recognizer 110 may also recognize a traveling lane by recognizing not only the road lane marking but also lane boundaries (road boundaries) including the road lane marking, a road shoulder, a curb, a median strip, a guardrail, and the like. In this recognition, the position of the host vehicle M acquired from the navigation device 50 and a result of processing by the INS may be taken into account. In addition, the recognizer 110 recognizes stop lines, obstacles, red lights, tollhouses, and other road events.

The recognizer 110 recognizes the position and posture of the host vehicle M with respect to a traveling lane when a traveling lane is recognized. The recognizer 110 recognizes, for example, a deviation of a reference point of the host vehicle M from a center of the lane and an angle of the host vehicle M, formed with respect to a line connecting the centers of the lane in the traveling direction, as a relative position and the posture of the host vehicle M with respect to the traveling lane. Instead, the recognizer 110 may recognize the position or the like of the reference point of the host vehicle M with respect to any side end (a road lane marking or road boundary) of the traveling lane as the relative position of the host vehicle M with respect to the traveling lane.

A driver recognizer (an example of a "determiner") 120 detects whether the driver is in a predetermined state on the basis of an image captured by the driver monitor camera 70. The predetermined state is a state in which hands-off lane keeping control (an example of "first movement control") to be described below can be executed. Hands-off is a state in which the driver is not gripping the steering wheel, and hands-on is a state in which the driver is gripping the steering wheel. The state in which the hands-off lane keeping control can be executed is a state in which the driver is monitoring the front. Monitoring the front means, for example, that the driver is monitoring the front so that the driver can quickly take over from control of the vehicle by the system to an operation of the vehicle by the driver. Monitoring the front means, for example, that the driver's line of sight is facing forward.

The speed controller 130 automatically controls the traveling drive force output device 200 and the brake device 210 without depending on an operation of the driver, and automatically controls the speed of the host vehicle M. The speed controller 130 controls, for example, the traveling drive force output device 200 and the brake device 210 automatically without depending on the operation of the driver such that the host vehicle M moves at a speed set by the driver or a legal speed when there are no other vehicles in front of the host vehicle M and within a predetermined distance from the host vehicle M. The speed controller 130 executes so-called cruise control (CC).

For example, when other vehicles are present in front of the host vehicle M and within a predetermined distance from the host vehicle M, the speed controller 130 automatically controls the traveling drive force output device 200 and brake device 210 without depending on the operation of the driver so as to follow the other vehicles. "Follows" means that the host vehicle M travels while keeping a position with a predetermined distance from other vehicles when it is behind the other vehicles. The speed controller 130 executes so-called adaptive cruise control (ACC).

The lane keeping controller 140 controls the steering device 220 so that the host vehicle M does not deviate from the traveling lane. For example, the lane keeping controller 140 controls the steering device 220 so that the host vehicle M travels in a center or near the center of the traveling lane recognized by the recognizer 110. In the following description, this control may be referred to as "lane keeping control." The lane keeping controller 140 executes hands-on lane keeping control and the hands-off lane keeping control.

The hands-on lane keeping control is control that is executed in a state in which the driver is gripping the steering wheel (a state in which the steering grip sensor 86 is detecting the gripping of the steering wheel). Conditions under which the hands-on lane keeping control can be executed are less stringent than conditions under which the hands-off lane keeping control can be executed. For example, the hands-on lane keeping control is executed on a condition that the speed of the host vehicle M is equal to or higher than a predetermined speed and that the driver is monitoring the front.

The hands-off lane keeping control is control that is executed in a state in which the driver is not gripping the steering wheel (a state in which the steering grip sensor 86 does not detect the gripping of the steering wheel). The hands-off lane keeping control can be executed, for example, when the following conditions are satisfied. The conditions are that the speed of the host vehicle M is equal to or higher than a predetermined speed, the host vehicle M is following a preceding vehicle, the host vehicle M is traveling on a predetermined road (for example, a road or a road type set in advance that the hands-off lane keeping control can be executed) is determined), and the driver is monitoring the front. That is, the hands-off lane keeping control is executed when the driver is monitoring the front, and the hands-off lane keeping control is not performed or stopped when the driver is not monitoring the front.

The conditions under which the hands-on lane keeping control and the hands-off lane keeping control described above can be executed are examples, and may include other conditions or some conditions are omitted. The conditions under which the hands-on lane keeping control can be executed may be less stringent than the conditions under which the hands-off lane keeping can be executed (The conditions under which the hands-off lane keeping control can be executed may be more stringent than the conditions under which the hands-on lane keeping can be executed).

The lane change controller 150 causes the host vehicle M to automatically change lanes. The lane change controller 150 causes the host vehicle M to automatically change lanes (automatic lane change) when a lane change instruction is given by the driver in a state in which the hands-off lane keeping control is being executed. The lane change instruction is an operation of the direction indicator operation switch 84. For example, when an operation of the first operation mode or an operation of the second operation mode is performed, the lane change controller 150 executes a lane change. The lane change instruction may also be an operation different from the operation of the direction indicator operation switch 84. For example, a lane change may be performed when a predetermined operation button is pressed.

The lane change controller 150 executes a lane change on the condition that the driver is gripping the steering wheel (the steering grip sensor 86 detects the gripping of the steering wheel). The lane change controller 150 executes a lane change when the driver is gripping the steering wheel and, for example, the following conditions are satisfied.

The conditions are, for example, that there are no obstacles in a lane that is a destination of a lane change, that there is no interference with other vehicles in the vicinity when a lane change is performed, that it is not a section in which a lane change is prohibited (no road markings or signs for prohibiting a lane change), that a lane that is a destination of a lane change is recognized (is actually present), that a yaw rate detected by the vehicle sensor 30 is less than a threshold value, and that a radius of curvature of a road on which the vehicle is traveling is equal to or greater than a predetermined value. The conditions for executing a lane change may include other conditions, or some conditions may be omitted. An automatic lane change executed by the lane change controller 150 is an example of a "second movement control." A functional configuration combining the lane keeping controller 140 and the lane change controller 150 is an example of a "controller."

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an ECU that controls these. The ECU controls the configuration described above according to information input from the driving support device 100 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the driving support device 100 or the information input from the driving operator 80 so that a brake torque according to a braking operation is output to each wheel.

The steering device 220 includes, for example, a steering ECU and an electric motor. The electric motor changes, for example, a direction of a steering wheel by applying a force to a rack and pinion mechanism. The steering ECU drives the electric motor according to the information input from the driving support device 100 or the information input from the driving operator 80, and changes the direction of the steering wheel.

Flowchart

Figure 2:
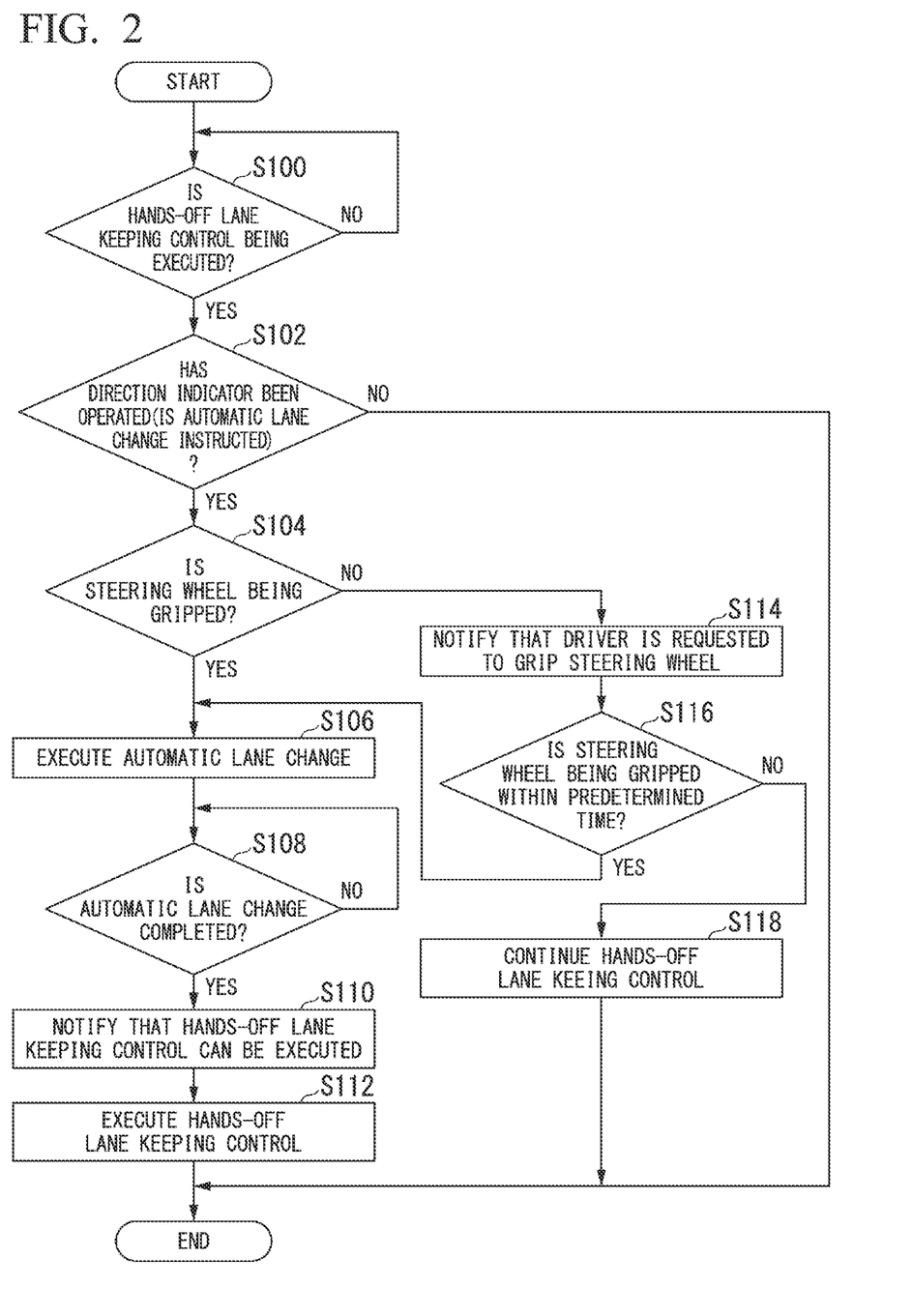
FIG. 2 is a flowchart which shows an example of a flow of processing executed by a driving support device.

FIG. 2 is a flowchart which shows an example of a flow of processing executed by the driving support device 100. First, the lane keeping controller 140 determines whether the hands-off lane keeping control is being executed (step S100). When the hands-off lane keeping control is being executed, the lane change controller 150 determines whether the direction indicator operation switch 84 has been operated (step S102). In other words, the lane change controller 150 determines whether an automatic lane change has been instructed.

When an automatic lane change has been instructed, the lane change controller 150 determines whether the steering wheel is being gripped on the basis of a detection result of the steering grip sensor 86 (step S104). When the steering wheel is being gripped, the lane change controller 150 executes the automatic lane change (step S106). More specifically, the lane change controller 150 executes the automatic lane change when the steering wheel is being gripped and the conditions for executing the automatic lane change described above are satisfied. When the steering wheel is being gripped but the conditions for executing the automatic lane change are not satisfied, the lane change controller 150 notifies the driver via the HMI 30 that the automatic lane change cannot be executed and a reason why it cannot be executed (for example, there are other vehicles in the vicinity, it is a section in which a lane change is prohibited, and the like.)

Next, the lane change controller 150 determines whether the automatic lane change has been completed (step S108). For example, the lane change controller 150 determines that the automatic lane change is completed when the host vehicle M has moved to a lane that is a destination of the lane change and the host vehicle M is positioned in a center or near the center of the lane to which it has moved.

When the automatic lane change is completed, the lane keeping controller 140 acquires information indicating that the automatic lane change has been completed from the lane change controller 150, and notifies the driver via the HMI 30 that the hands-off lane keeping control can be executed according to the acquired information (step S110). Next, the lane change controller 150 executes the hands-off lane keeping control (step S112). The driving support device 100 stops the automatic lane change (second movement control) and resumes the hands-off lane keeping control (first movement control) when the lane change is completed. As a result, in a hands-off state, the host vehicle M travels in a center or near the center of a traveling lane.

When the automatic lane change is completed in step S108, the hands-on lane keeping control may be executed instead of the hands-off lane keeping control, or the hands-off lane keeping control may be executed after the hands-on lane keeping control is executed temporarily.

When the steering wheel is not being gripped in step S104, the lane change controller 150 notifies the driver via the HMI 30 that the driver is requested to grip the steering wheel (step S114).

Next, the lane change controller 150 determines whether the steering wheel is being gripped within a predetermined time from the notification of step S114 on the basis of the detection result of the steering grip sensor 86 (step S116). When the steering wheel is being gripped within a predetermined time from the notification of step S114, the processing proceeds to step S106 and the lane change controller 150 executes the automatic lane change (step S106). The driving support device 100 stops the hands-off lane keeping control and executes the automatic lane change when the gripping of the steering wheel is detected after the direction indicator operation switch 84 is operated while the hands-off lane keeping control is being executed with the steering wheel not being gripped.

When the steering wheel is being gripped within a predetermined period of time after the notification of step S114, the automatic lane change may be executed after the hands-on lane keeping control (another example of the "second movement control") is temporarily executed.

If the steering wheel is not being gripped within a predetermined time from the notification of step S114, the lane keeping controller 140 executes (continues) the hands-off lane keeping control (step S118). The driving support device 100 notifies the driver via the HMI 40 that the driver is requested to grip the steering wheel when the gripping of the steering wheel is not detected after the direction indicator operation switch 84 is operated while the hands-off lane keeping control is executed with the steering wheel not being gripped, and continues the hands-off lane keeping control without executing the automatic lane change when the gripping is not detected after the notification is made.

If the steering wheel is not being gripped within a predetermined time from the notification of step S114, the lane keeping controller 140 may perform notification indicating that the automatic lane change will be canceled or that the hands-off lane keeping control will be continued.

As described above, since the driving support device 100 realizes control that matches an intention of the user and control that does not go against the intention of the user, it is possible to improve the user's convenience.

For example, after the processing of step S104 (when the steering wheel is being gripped and other lane conditions are satisfied), the lane change controller 150 changes lanes by causing the direction indicator to light or blink. The driving support device 100 may cause the host vehicle to change lanes to a lane adjacent to the traveling lane by causing the direction indicator to light or blink when the gripping of the steering wheel is detected after the direction indicator operation switch 84 is operated while the hands-off lane keeping control is being executed with the steering wheel not being gripped and the lane change conditions are satisfied, and may also cause the host vehicle M not to change lanes to a lane adjacent to the traveling lane without causing the direction indicator to light or blink (for example, without causing the direction indicator to light or blink even not once) when the gripping of the steering wheel is not detected after the direction indicator operation switch 84 is operated while the hands-off lane keeping control is being executed with the steering wheel not being gripped and the lane change conditions are not satisfied.

Instead of the example described above, the lane change controller 150 may cause the direction indicator to light or blink when the direction indicator is operated in step S102. In this case, in the processing of step S116, when the steering wheel is not being gripped within a predetermined time from the notification, the lane change controller 150 turns off the direction indicator. The driving support device 100 causes the direction indicator to light or blink according to an operation of the direction indicator operation switch 84 after the direction indicator operation switch 84 is operated while the hands-off lane keeping control is being executed with the steering wheel not being gripped, notifies the driver that the driver is requested to grip the steering wheel after the operation is performed, and continues the hands-off lane keeping control and returns the direction indicator to a state before the operation without shifting to the automatic lane change when the gripping is not detected after the notification is made.

In the example described above, when the driving support device 100 starts control that is not being executed, it may notify via the HMI 30 that the control will be started before the start. For example, when the driving support device 100 starts the hands-off lane keeping control when the hands-off lane keeping control is not being executed, it notifies that the hands-off lane keeping control will be started before the start. For example, when the driving support device 100 starts the automatic lane change when the automatic lane change is not being executed, it notifies via the HMI 30 that the automatic lane change will be started before the start.

As a result, the driver can recognize the control that is started in advance, which improves the driver's sense of security.

Scene 1

Figure 3:
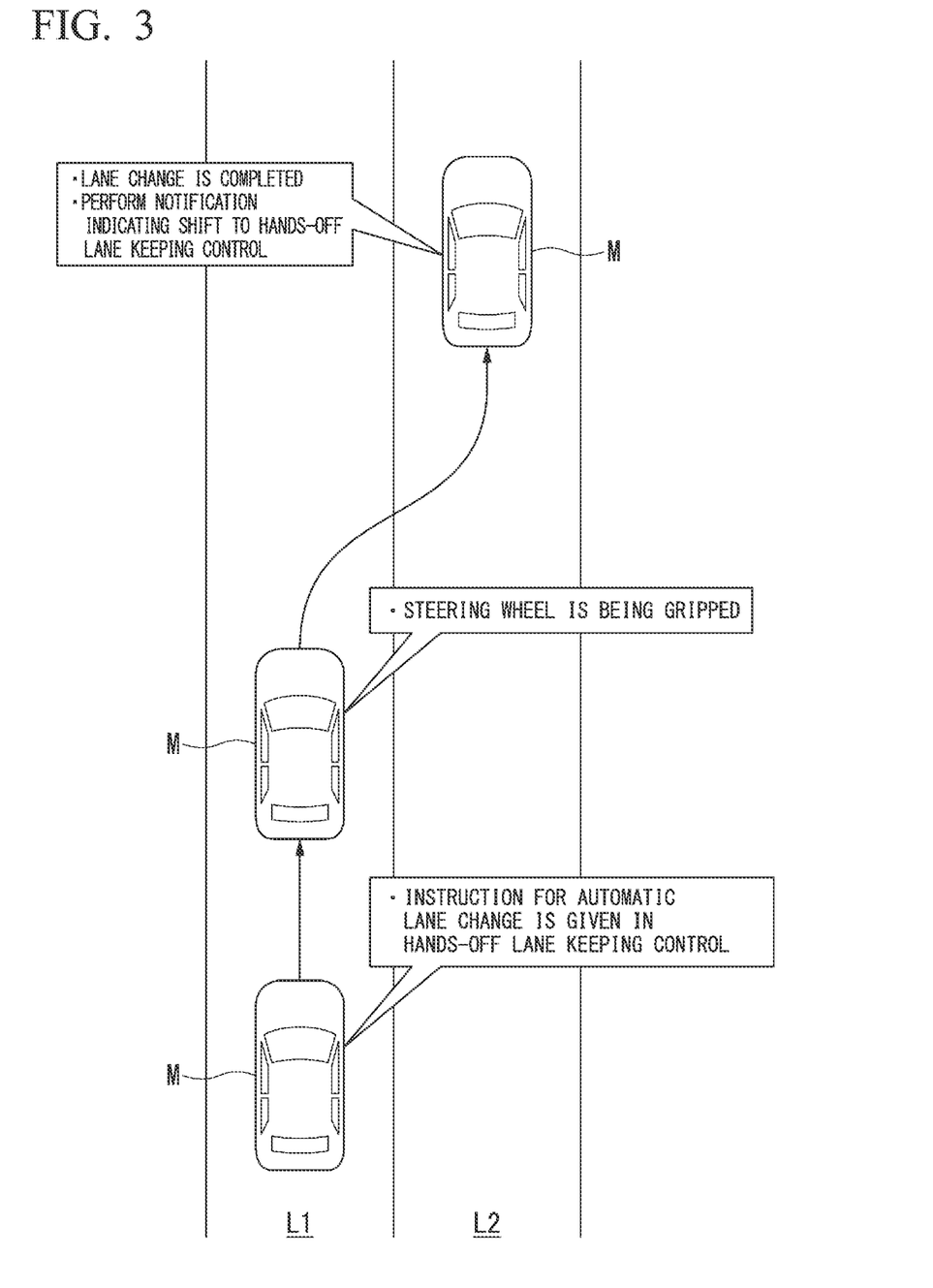
FIG. 3 is a diagram which shows a scene in which a steering wheel is being gripped after a lane change instruction is given according to the present embodiment.

FIG. 3 is a diagram which shows a scene in which the steering wheel is being gripped after a lane change instruction is given according to the present embodiment. FIG. 3 shows an example of a behavior of the host vehicle M corresponding to the processing of steps S100-S112 in the flowchart of FIG. 2. For example, the host vehicle M changes lanes from a lane L1 to a lane L2 when an automatic lane change instruction is given while the hands-off lane keeping control is being executed and the steering wheel is being gripped. After the lane change is completed, the host vehicle M notifies that it will shift to the hands-off lane keeping control.

In this manner, the driver can make the host vehicle M smoothly change lanes without any operation.

Figure 4:
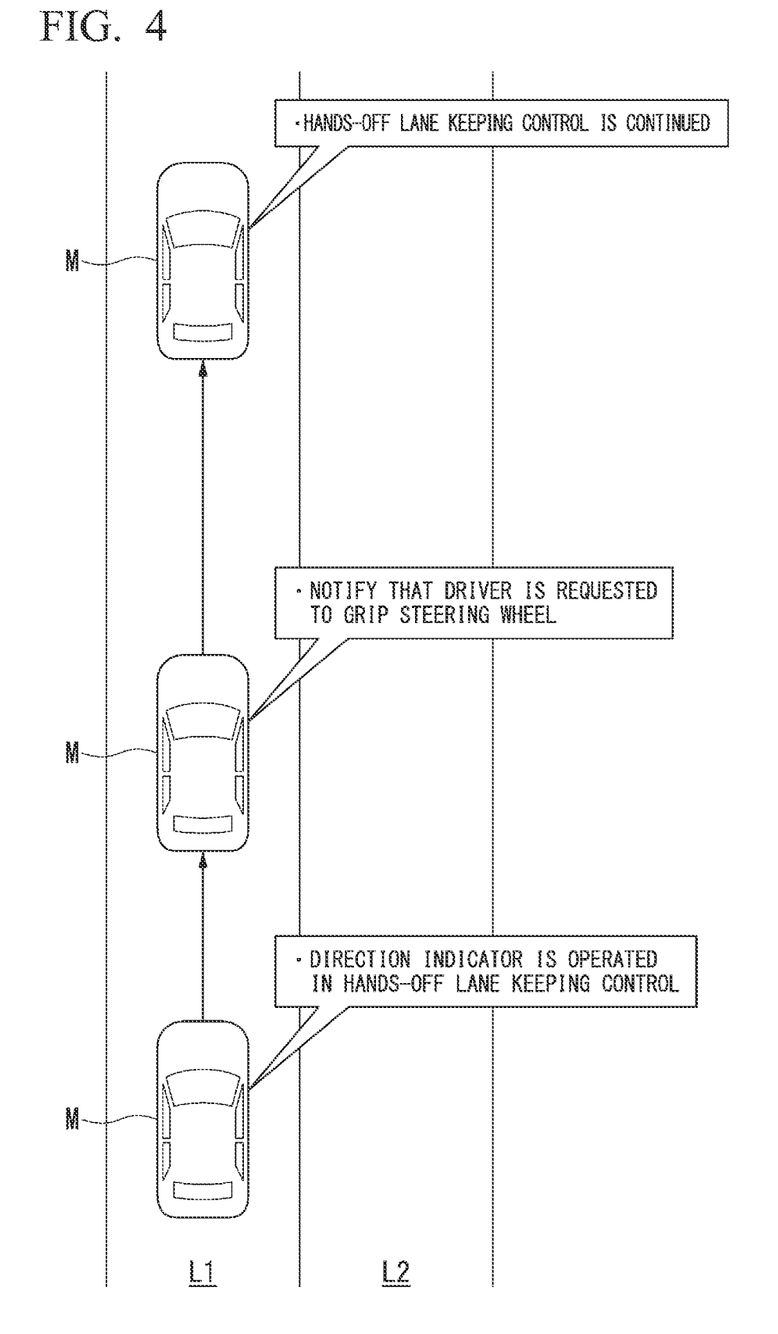
FIG. 4 is a diagram which shows a scene in which the steering wheel is not being gripped after a lane change instruction is given according to the present embodiment.

FIG. 4 is a diagram which shows a scene in which the steering wheel is not being gripped after a lane change instruction is given according to the present embodiment. FIG. 4 is an example of the behavior of the host vehicle M, which corresponds to the processing of steps S100 to S104 and S114 to S120 in the flowchart of FIG. 2. For example, when an automatic lane change instruction is given and the steering wheel is not being gripped while the hands-off lane keeping control is being executed, the host vehicle M does not change lanes and continues to execute the hands-off lane keeping control in the lane L1.

In this manner, even if the direction indicator operation switch 84 is operated by mistake, an intention is changed after an operation, or the steering wheel is not being gripped for some reasons, since the hands-off lane keeping control continues, the user's convenience is improved and marketability is improved as compared to a comparative example.

Comparative Example

Figure 5:
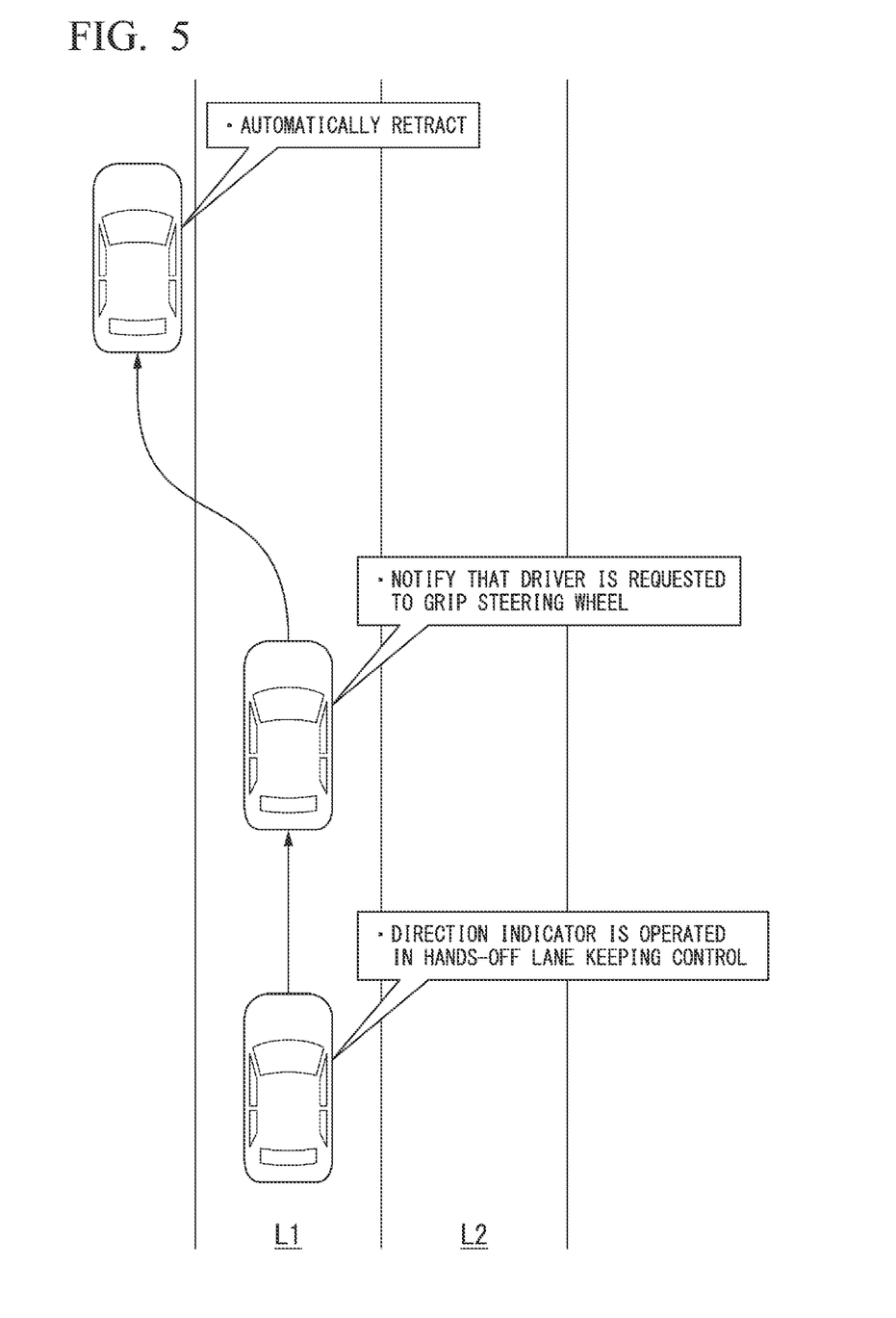
FIG. 5 is a diagram which shows a scene in which the steering wheel is not being gripped after a lane change instruction is given in a comparative example.

FIG. 5 is a diagram which shows a scene in which the steering wheel is not being gripped after a lane change instruction is given in a comparative example. FIG. 5 is a diagram for describing differences from the behavior of the host vehicle M in FIG. 4. In the comparative example, while an automatic lane change instruction is given and the steering wheel is not being gripped while the hands-off lane keeping control is being executed, a host vehicle of the comparative example automatically retracts into the surrounding space (for example, a space adjacent to the lane L1). In other words, a behavior that is not intended by the user is performed, which results in increasing a burden on the user. For example, the user may want to travel in the traveling lane even if the user cannot change lanes, but if the host vehicle retracts, the user needs to cause the host vehicle to start traveling again from a state of being retracted, which results in increasing the burden on the user.

In contrast, as described above, the driving support device 100 of the present embodiment continues lane keeping control without retracting even when the steering wheel is not being gripped and the lane change is not executed, thereby improving user convenience. Furthermore, the marketability is improved.

The embodiments described above can be expressed as follows.

A mobile object control device includes a storage device that has stored a program, and a hardware processor, in which the hardware processor executes the program stored in the storage device, thereby executing processing of detecting whether a steering wheel is being gripped by a user who operates a mobile object, processing of executing first movement control that is executable with the steering wheel not being gripped and second movement control that is executable with the steering wheel being gripped, processing of notifying the user, by using an outputter, that the user is requested to grip the steering wheel when gripping of the steering wheel is not detected after a direction indicator is operated while the first movement control is being executed with the steering wheel not being gripped, and processing of continuing the first movement control without shifting to the second movement control when the gripping is not detected after the notification is made.

Although a mode for carrying out the present invention has been described above using the embodiment, the present invention is not limited to the embodiment, and various modifications and substitutions can be made within a range not departing from the gist of the present invention. As used throughout this disclosure, the singular forms "a," "an," and "the" include plural reference unless the context clearly dictates otherwise.

What is claimed is:

1. A control device comprising:
   a storage medium configured to store computer-readable instructions; and
   at least one processor connected to the storage medium, wherein the at least one processor executes the computer-readable instructions, thereby
   detecting whether a steering wheel is being gripped by a user who operates a mobile object,
   executing first movement control that is executable with the steering wheel not being gripped, and second movement control that is executable with the steering wheel being gripped,
   notifying the user, by using an outputter, that the user is requested to grip the steering wheel when gripping of the steering wheel is not detected after an operator for operating a direction indicator is operated by the user while the first movement control is being executed with the steering wheel not being gripped,
   continuing the first movement control without shifting to the second movement control when the gripping is not detected after the notification is made,
   wherein, after the operator for operating the direction indicator is operated by the user while the first movement control is being executed with the steering wheel not being gripped, the at least one processor causes the mobile object to change lanes to a lane adjacent to a traveling lane by causing the direction indicator to light or blink from a turned off state of the direction indicator when (i) gripping of the steering wheel is detected and (ii) lane change conditions are satisfied, and
   after the operator for operating the direction indicator is operated by the user while the first movement control is being executed with the steering wheel not being gripped, the at least one processor does not cause the mobile object to change lanes to a lane adjacent to a traveling lane without causing the direction indicator to light or blink from a turned off state of the direction indicator when (i) gripping of the steering wheel is not detected or (ii) lane change conditions are not satisfied.

2. The control device according to claim 1, wherein the at least one processor stops the first movement control and executes the second movement control when gripping of the steering wheel is detected after the operator for operating the direction indicator is operated while the first movement control is being executed with the steering wheel not being gripped.

3. The control device according to claim 2, wherein the second movement control is control that causes the mobile object to change lanes according to an operation of the operator.

4. The control device according to claim 3, wherein the at least one processor stops the second movement control and resumes the first movement control when the lane change is completed.

5. The control device according to claim 1, wherein the at least one processor notifies that the first movement control will be started before the starting first movement control when the at least one processor starts the first movement control when the first movement control is not being executed.

6. The control device according to claim 1, wherein the at least one processor notifies that the second movement control will be started before starting the second movement control when the processor starts the second movement control when the second movement control is not being executed.

7. The control device according to claim 1, wherein the first movement control is control that causes the mobile object to move without depending on an operation of the user so that the mobile object does not deviate from a traveling lane with the steering wheel not being gripped, and the second movement control is control that causes the mobile object to change lanes, without depending on an operation of the user, to a lane adjacent to the traveling lane from the traveling lane with the steering wheel being gripped.

8. The control device according to claim 7, wherein the at least one processor determines whether the user is monitoring the front on the basis of an image captured by a camera that captures an image of the user,
   executes the first movement control when the user is monitoring the front, and
   does not execute the first movement control or stops the first movement control that is being executed when the user is not monitoring the front.

9. The control device according to claim 1, wherein the at least one processor causes the direction indicator to light or blink according to an operation of the operator after the operator for operating the direction indicator is operated while the first movement control is being executed with the steering wheel not being gripped, notifies the user that the user is requested to grip the steering wheel after the operation is performed, and continues the first movement control and returns the direction indicator to a state before the operation without shifting to the second movement control when the gripping is not detected after the notification is made.

10. A control method comprising:
   by a control device,
   processing of detecting whether a steering wheel is being gripped by a user who operates a mobile object;
   processing of executing first movement control that is executable with the steering wheel not being gripped and second movement control that is executable with the steering wheel being gripped;
   processing of notifying the user, by using an outputter, that the user is requested to grip the steering wheel when gripping of the steering wheel is not detected after an operator for operating a direction indicator is operated by the user while the first movement control is being executed with the steering wheel not being gripped;
   processing of continuing the first movement control without shifting to the second movement control when the gripping is not detected after the notification is made;
   after the operator for operating the direction indicator is operated by the user while the first movement control is being executed with the steering wheel not being gripped, processing of causing the mobile object to change lanes to a lane adjacent to a traveling lane by causing the direction indicator to light or blink from a turned off state of the direction indicator when (i) gripping of the steering wheel is detected and (ii) lane change conditions are satisfied; and
   after the operator for operating the direction indicator is operated by the user while the first movement control is being executed with the steering wheel not being gripped, processing of not causing the mobile object to change lanes to a lane adjacent to a traveling lane without causing the direction indicator to light or blink from a turned off state of the direction indicator when (i) gripping of the steering wheel is not detected or (ii) lane change conditions are not satisfied.

11. A non-transitory computer storage medium that has stored a program causing a control device to execute
   processing of detecting whether a steering wheel is being gripped by a user who operates a mobile object;
   processing of executing first movement control that is executable with the steering wheel not being gripped and second movement control that is executable with the steering wheel being gripped;
   processing of notifying the user, by using an outputter, that the user is requested to grip the steering wheel when gripping of the steering wheel is not detected after an operator for operating a direction indicator is operated by the user while the first movement control is being executed with the steering wheel not being gripped;
   processing of continuing the first movement control without shifting to the second movement control when the gripping is not detected after the notification is made;
   after the operator for operating the direction indicator is operated by the user while the first movement control is being executed with the steering wheel not being gripped, processing of causing the mobile object to change lanes to a lane adjacent to a traveling lane by causing the direction indicator to light or blink from a turned off state of the direction indicator when (i) gripping of the steering wheel is detected and (ii) lane change conditions are satisfied; and
   after the operator for operating the direction indicator is operated by the user while the first movement control is being executed with the steering wheel not being gripped, processing of not causing the mobile object to change lanes to a lane adjacent to a traveling lane without causing the direction indicator to light or blink from a turned off state of the direction indicator when (i) gripping of the steering wheel is not detected or (ii) lane change conditions are not satisfied.

12. A control device comprising:
   a storage medium configured to store computer-readable instructions; and
   at least one processor connected to the storage medium,
   wherein the at least one processor executes the computer-readable instructions, thereby
   detecting whether a steering wheel is being gripped by a user who operates a mobile object, and
   executing first movement control which is a control that causes the mobile object to move without depending on an operation of the user so that the mobile object does not deviate from a traveling lane with the steering wheel not being gripped, second movement control which is a control that causes the mobile object to change lanes, without depending on an operation of the user, to a lane adjacent to the traveling lane from the traveling lane with the steering wheel being gripped, and third movement control which is a control that causes the mobile object to move without depending on an operation of the user so that the mobile object does not deviate from a traveling lane with the steering wheel being gripped,
   notifying the user, by using an outputter, that the user is requested to grip the steering wheel when gripping of the steering wheel is not detected after an operator for operating a direction indicator is operated while the first movement control is being executed, and
   continuing the first movement control when the gripping is not detected after the notification is made.

* * * * *